UNITED STATES PATENT OFFICE.

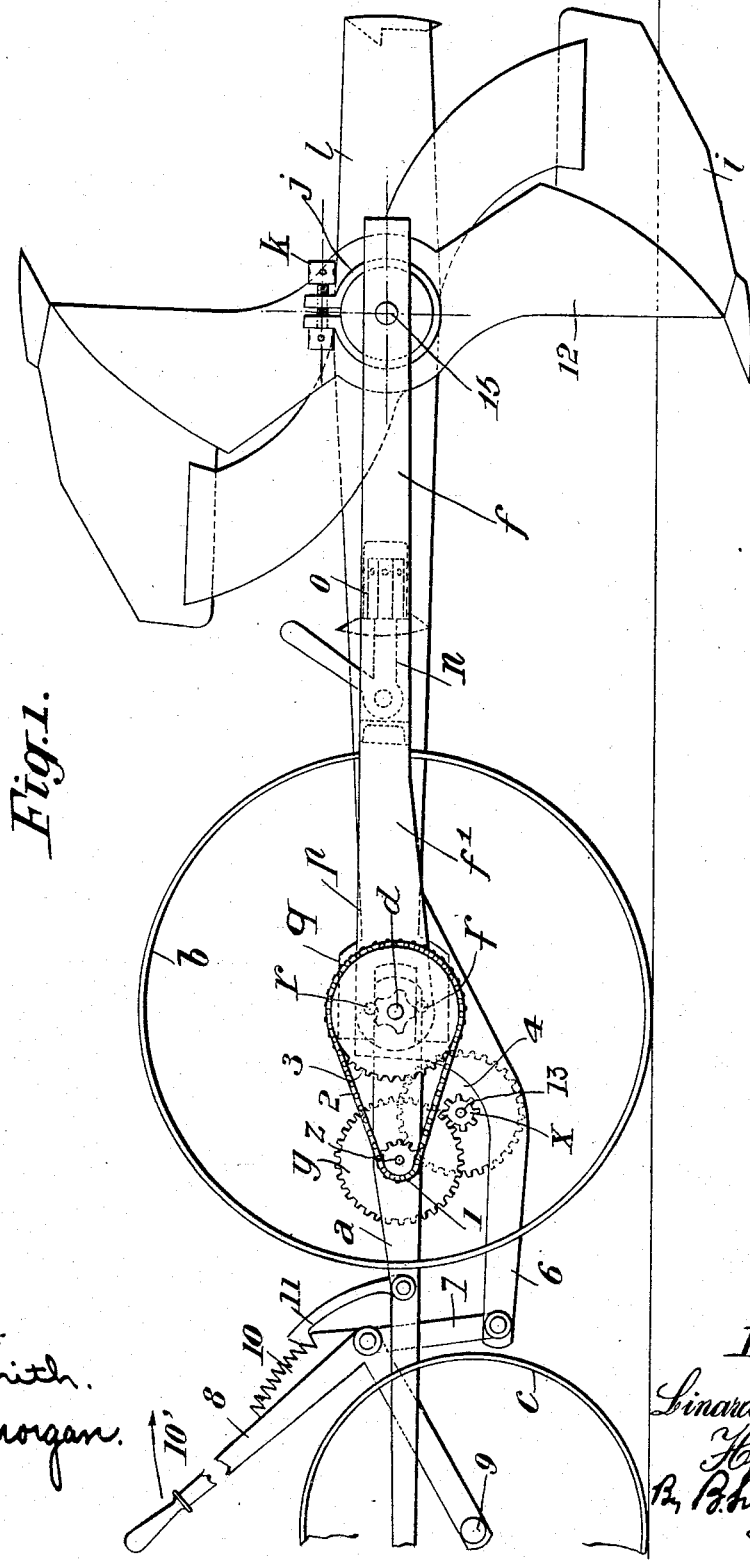

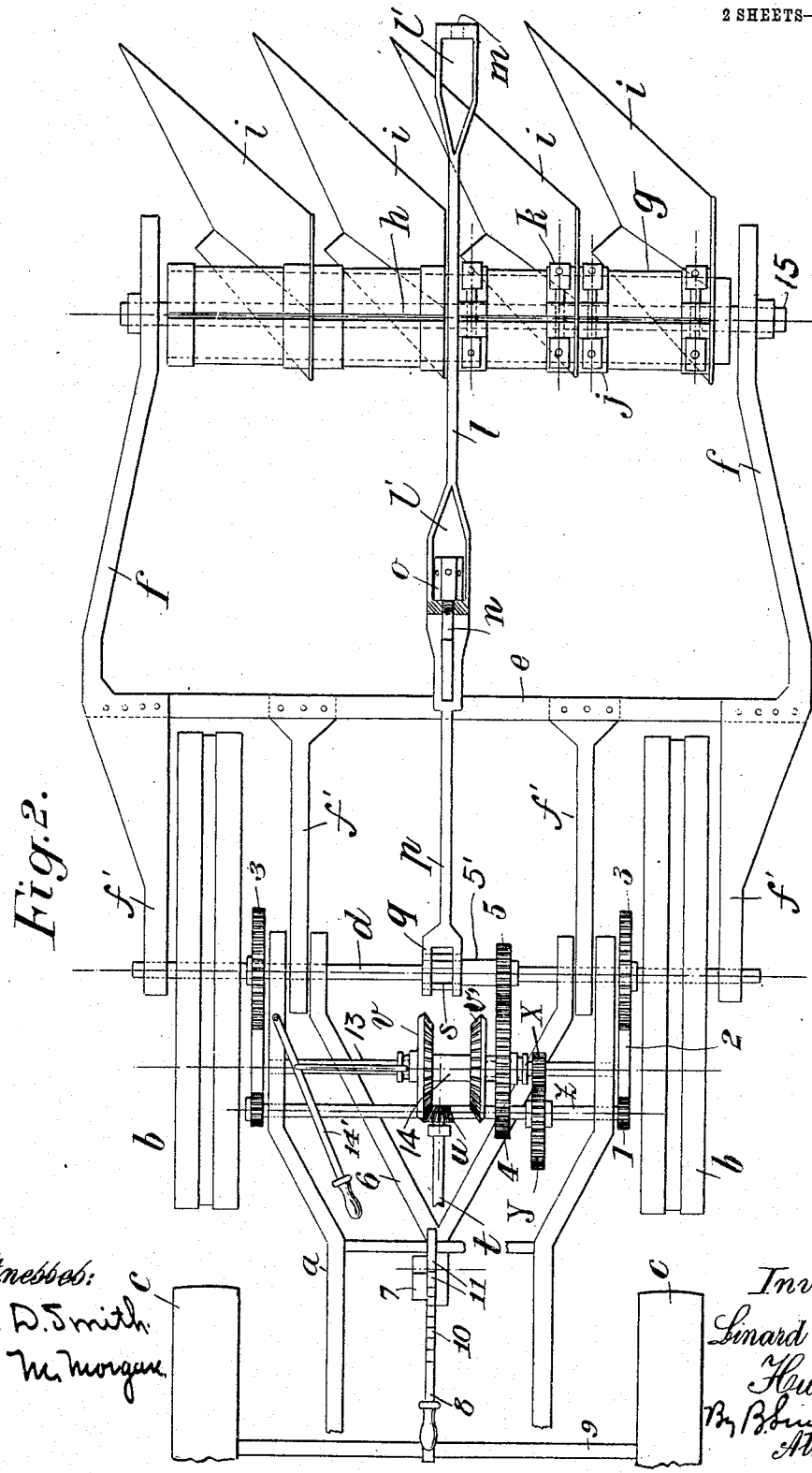

LINARD ALPHONSE HUBERT, OF TROYES, FRANCE.

GANG-PLOW.

939,132.  Specification of Letters Patent.  Patented Nov. 2, 1909.

Application filed August 19, 1908. Serial No. 449,315.

*To all whom it may concern:*

Be it known that I, LINARD ALPHONSE HUBERT, a citizen of the French Republic, and resident of Troyes, France, have invented certain new and useful Improvements in and Relating to Gang-Plows, of which the following is a specification.

This invention relates to improvements in gang plows and has for its object the provision of a construction whereby the plow shares are vibrated when turning over the soil for the purpose of reducing the power necessary to advance the plows. The vibration of the plow shares serves to effectively cut the sod and turn the soil with a greatly reduced amount of power when compared to prior methods of applying a direct and constant pull to the plows.

The structure according to my improved device enables the disposition of the plows in a straight line and avoids the oblique arrangement of the plow shares heretofore necessary.

The invention will be more fully described in connection with the accompanying drawings and will be more particularly pointed out and ascertained in and by the appended claims.

In the drawings:—Figure 1 is a view in side elevation of a gang plow embodying the main features of my invention. Fig. 2 is a plan view thereof.

Like characters of reference designate similar parts throughout the different figures of the drawings.

As shown $d$ designates an axle upon which drive-wheels $b$ are mounted for the purpose of advancing the plow structure over the field. The axle $d$ is provided with sprocket wheels 3 driven by chains 2 from sprocket pinions 1, the latter being mounted on shaft $z$. A gear wheel $y$, mounted on shaft $z$ meshes with a gear wheel X mounted upon shaft 13. The shafts $z$ and 13 are mounted in the main frame $a$ which is supported by the axle $d$ and the steering wheels $c$. The shaft 13 carries a sleeve 14, which is slidably and non-rotatably mounted thereon, and said sleeve 14 is provided with bevel gears $v$ and $v'$. A lever $14'$ is connected with the sleeve 14 to shift the same on the shaft 13. A driving shaft $t$ is indicated, which may be driven from any suitable source of power, and is provided with a bevel pinion $u$ adapted to mesh with bevel gears $v$ and $v'$ when the sleeve 14 is shifted on the shaft 13. The sleeve 14 also carries a gear wheel 4 which meshes with a gear wheel 5 and said gear wheel 5 is mounted upon a sleeve $5'$ which carries a vibrator $s$. Said sleeve $5'$ is non-slidably and rotatably mounted upon the axle $d$. As shown power is transmitted through bevel gears $u$, $v$ and sleeve 14 to shaft 13 and from shaft 13 through gears X, Y to shaft $z$. Shaft $z$ acting through sprocket pinions 1 and chains 2 drives sprocket wheels 3 and axle $d$ and wheels $b$ forwardly. When the sleeve 14 is shifted to bring the bevel gear $v'$ into mesh with the pinion $u$ the gear 4 is thrown out of mesh with gear 5 and power is transmitted through pinion $u$ to $v'$ and thence through shaft 13 and gears X, Y, 1 and chains 2 and sprockets 3 in a reverse direction from the adjustment first described and the adjustment shown. It will be seen that when the pinion $u$ meshes with the pinion $v$ the wheel 5 will be rotated as this would be the adjustment used when the plow structure is advancing in a forward direction but when the reverse adjustment is desired the wheel 5 will not be operated and the gear connection shown will drive the wheels $b$ in a rearward direction.

A plow frame is provided which consists of a transverse member $e$ to the ends of which extensions $f$ are mounted. The plow shares are mounted on the extensions $f$ as will hereinafter more fully appear. Extensions $f'$ are mounted upon the axle $d$ so as to be swung around the same. An adjusting frame 6 is mounted upon the axle $d$ and is connected with the innermost extensions $f'$ and at its forward end said frame 6 is connected by a link 7 to an adjusting lever 8, pivotally mounted at 9. The adjusting lever 8 is provided with a rack 10 adapted to be engaged by a pawl 11 pivotally mounted upon the frame $a$. It will be seen that by adjusting the lever 8 in the direction of the arrow $10'$ that the frame 6 will be depressed and the extensions $f$ will be raised. The pawl does not serve to lock the lever 8 in any position of adjustment.

A rod 15 is fixed to the extensions $f$ and sleeves $g$ are loosely mounted upon said rod. Plow shares $i$ are supported from the sleeves $g$ by means of clamp collars $j$ embracing the sleeves $g$ and adapted to be tightened or fixed thereon by threaded rods $k$. A reversible vibrating member $l$ is fixed to the sleeves $g$ and is rotatably mounted on the rod 15 and said member $l$ is provided at its opposite ends with loops $l'$ in the end walls of which apertures $m$ are formed. An arm $p$ is provided with a forked end $q$ having rollers $r$ adapted to be actuated by the vibrator $s$. Said arm $p$ extends through either of the apertures $m$ and is locked therein by a nut $o$. The arm $p$ may be provided with a pivoted member $n$ having a handle and a threaded extension on which the nut $o$ may be secured. It will be seen that by disengaging the nut $o$ the sleeves $g$ may be rotated by the member $l$ to bring either set of plows into action. It will also be obvious that when the axle $d$ is rotated the vibrator $s$ will impart vibratory movement to the connections $e$ and $l$ so as to vibrate the plows $i$ continuously.

I claim:—

1. A gang plow comprising in combination, driving wheels and an axle therefor, a driving shaft, means operatively interposed between said axle and driving shaft for driving the former in reverse directions, a main frame mounted on said axle, a plow frame mounted on said axle, a plurality of sets of plows mounted on said plow frame, the plows of each set being arranged in transverse alinement with respect to the longitudinal axis of the gang plow, means connecting the plow frame with the main frame to tilt the former, means for throwing either sets of plows into or out of an operative position, and means for imparting continuous vibratory movement to said plows.

2. A gang plow comprising in combination, driving wheels and an axle therefor, means for driving said axle, a main frame mounted on said axle, a plow frame mounted on said axle, a plurality of sets of plows mounted on said plow frame, the plows of each set being arranged in transverse alinement with the longitudinal axis of the gang plow, means for throwing either sets of plows into or out of an operative position, and means for imparting continuous vibratory movement to said plows.

3. A gang plow comprising in combination, driving wheels and an axle therefor, means for operating said axle, a main frame mounted on said axle, a plow frame mounted on said axle, plows mounted on said plow frame in transverse alinement with respect to the longitudinal axis of the gang plow, and means imparting continuous vibratory movement to said plows.

In testimony whereof I have hereunto set my hand in presence of two witnesses.

LINARD ALPHONSE HUBERT.

Witnesses:
 PIERRE VILLAIN,
 H. C. COXE.